Patented May 14, 1935

2,001,412

UNITED STATES PATENT OFFICE 2,001,412

MANUFACTURE OF CHEWING GUM

Alfred Falk, Munich, Germany

No Drawing. Application March 24, 1933, Serial No. 662,529. In Germany April 19, 1932

1 Claim. (Cl. 99—16)

In the manufacture of chewing gum it is, in general, usual to mix the foundation, that is a raw rubber mass, with certain resins for the purpose of imparting the desired consistency to the gum and causing the medicinal and flavouring ingredients which are usually added, to amalgamate and coalesce more readily with the said rubbery mass or foundation.

Chewing gum masses mixed with said resins, however, do not possess the desirable tractility, they are rather very sticky and particularly tend to adhere to the teeth and cannot stand higher temperatures during manufacture. For this reason they cannot be used except within narrow limits, in particular not in case that the special ingredients to be mixed therewith, require comparatively high temperatures for a thorough and intimate mixture.

Now, I have found that the above stated defects or disadvantages can be overcome by employing $\alpha$-dammaro-resene, (see Tschirch, Harze und Harzbehälter, 1906, vol. I, pages 487 and 488) in lieu of the hitherto used resins. Chewing gum manufactured in this way, that is to say, by mixing the original rubbery mass with an adequate proportion of $\alpha$-dammaro-resene, is far superior to hitherto known gums as regards tractility or extensibility and, therefore, can be mixed most intimately and thoroughly with any required ingredients of medicinal or flavouring nature, to form a homogeneous substance. Chewing gum manufactured according to the present invention and containing $\alpha$-dammaro-resene as a constituent will keep up its consistency for a long time even under the influence of air and light, and, therefore, can be kept or stored for a long time without requiring to be coated with a protective covering of sugar or the like as hitherto done. The same also stands temperatures up to about 190° C. without beginning to burn. Consequently it is also possible to gradually add to the rubbery mass ingredients of a high melting point at a temperature a few degrees only below the said high melting point and to thus cause the same to intimately coalesce with the rubbery mass, to form a homogeneous substance.

Obviously the proportion of $\alpha$-dammaro-resene to be added to the rubbery mass may vary in accordance with the particular properties and the amount of the other ingredients to be added. In some cases an admixture of $\alpha$-dammaro-resene amounting to about 1 per cent of the weight of the rubbery mass, will answer the purpose well, but even considerably larger proportions of $\alpha$-dammaro-resene up to 10 per cent and still more, may be used or added without detrimentally affecting the properties of the chewing gum, as otherwise would be the case if similarly high proportions of the usual resins were added to the same. For $\alpha$-dammaro-resene is not an acid or basic alkaline body, but a neutral one in contradistinction to other resins.

The following examples will serve to illustrate the nature of the invention, but they are merely typical cases and can be varied without departure from the nature of the invention. The parts are by metric weight.

Example I 100 gr. of purified crude rubber such as, for instance, chicle rubber, are comminuted in a mortar and subsequently subjected to a washing operation which is to be accomplished with successive small quantities of water only and continued for a sufficient length of time to remove all impurities, whereupon the resulting mass is dried in any appropriate way. The dry mass weighs about 80 gr. and is again triturated in a mortar upon addition of 30 gr. of powdered sugar. The resulting powder is forced through a hair-sieve and subsequently mixed with 1 gr. of $\alpha$-dammaro-resene. In the next step of the process the mass is heated in a sand-bath, with continuous stirring, until the same commences to melt or flow, whereupon further 30 gr. of powdered sugar are added to the mixture with constant stirring.

In the next following operation the mixture is allowed to cool down to about 40° C. and subsequently 6 gr. of carefully puverized rhatany are added thereto with continuous stirring. The mixture then is once more worked through and agitated and, having been allowed to cool down to about 38° C., intimately mixed with about 6 gr. of carefully powdered myrrh without discontinuing agitation. In the next step of the process, when the mixture has cooled down to about 32° C., 2.5 gr. of powdered salicylic-acid phenylic ester (denominated as "salol" in the trade) are admixed and finally 0.05 gr. of menthol and 0.001 gr. of pulverulent citric acid are added to the mixture immediately before the latter has cooled down to room temperature, that is a temperature at which menthol just will deliquesce.

The product manufactured in this way is preferably subjected to a final mixing and agitating treatment prior to its disintegration into the shaped articles.

Example II

The crude rubber after having been comminuted, washed and dried as described in the foregoing example and whereof the weight amounts to about 75 gr., is mixed with 5 gr. of α-dammaro-resene, disintegrated by trituration in a mortar and heated slowly to a temperature of 145° C. The mixture is allowed to cool down to 139° C., when 12 parts of aceto-p-phenetidine (phenacetine) having a melting point of 135° C., are added to and thoroughly mixed with the hot mass while agitating the same by incessant stirring. In the subsequent step of operation the mass or mixture is caused to cool down to about 60° C. and 8 gr. of pulverized sugar are admixed with continuous stirring.

In general, owing to the addition of α-dammaro-resene to a chewing gum foundation a chewing gum can be produced which is particularly valuable for the reason that the medicinal, flavouring and other constituents thereof will be freed and given up in the mouth uniformly during the entire time of chewing the gum. A protective coating of sugar or the like as usually employed in connection with chewing gums, may also be applied on chewing gums manufactured in accordance with the present invention, if required or preferred. This, however, is not necessary for the sake of durability.

It will be evident that my invention, while still being adhered to in its main essentials, may be varied and adapted in many ways according to the requirements desired, or most suitable under different circumstances.

What I claim is:

As a new article of manufacture a chewing gum, comprising a foundation of gum chicle, medicinal and flavouring ingredients of the usual character and an admixture of alpha-dammaro-resene, thoroughly mixed with the former ingredients in the proportion of about 0.5–10% of the latter.

ALFRED FALK.